(12) United States Patent
Bhattacharjee et al.

(10) Patent No.: US 10,291,667 B2
(45) Date of Patent: May 14, 2019

(54) BULK JOB PROVISIONING SYSTEM

(71) Applicant: Level 3 Communications, LLC, Broomfield, CO (US)

(72) Inventors: Raja Bhattacharjee, Broomfield, CO (US); Kenneth W. Dudley, Clinton Township, MI (US); Richard J. Das, Farmington, MI (US)

(73) Assignee: Level 3 Communications, LLC, Broomfield, CO (US)

( * ) Notice: Subject to any disclaimer, the term of this patent is extended or adjusted under 35 U.S.C. 154(b) by 240 days.

(21) Appl. No.: 15/012,293

(22) Filed: Feb. 1, 2016

(65) Prior Publication Data

US 2017/0223068 A1  Aug. 3, 2017

(51) Int. Cl.
*H04L 12/24* (2006.01)
*H04L 29/06* (2006.01)
*H04L 29/08* (2006.01)

(52) U.S. Cl.
CPC ........ *H04L 65/403* (2013.01); *H04L 41/0806* (2013.01); *H04L 67/06* (2013.01)

(58) Field of Classification Search
CPC ... G06Q 10/10; H04L 29/06; H04L 29/08072; H04L 29/06027; H04L 12/581; H04M 3/56; H04M 3/561; H04M 7/006; H04M 3/567
USPC ........................................................ 709/204
See application file for complete search history.

(56) References Cited

U.S. PATENT DOCUMENTS

| | | | | |
|---|---|---|---|---|
| 5,854,893 | A * | 12/1998 | Ludwig | G06Q 10/10 348/E7.081 |
| 7,213,050 | B1 * | 5/2007 | Shaffer | H04L 12/1813 370/261 |
| 9,112,709 | B1 * | 8/2015 | Tofigh | H04L 12/1818 |
| 2002/0065912 | A1 * | 5/2002 | Catchpole | G06F 17/30873 709/224 |
| 2004/0015953 | A1 * | 1/2004 | Vincent | G06F 8/65 717/173 |
| 2005/0084087 | A1 * | 4/2005 | Rajagopalan | G06F 15/16 379/205.01 |
| 2005/0198204 | A1 * | 9/2005 | Takahashi | G06F 21/6218 709/219 |
| 2005/0213567 | A1 * | 9/2005 | Mullins | H04M 3/22 370/352 |
| 2007/0266065 | A1 * | 11/2007 | Rosenberg | G06F 17/30053 |
| 2009/0006112 | A1 * | 1/2009 | White | G06Q 10/087 705/346 |
| 2009/0006936 | A1 * | 1/2009 | Parker | G06F 17/24 715/200 |

(Continued)

*Primary Examiner* — Mahran Y Abu Roumi (57) ABSTRACT

A method and system for receiving and executing a bulk provisioning job for a collaboration conferencing system is disclosed. In particular, the system receives a bulk provisioning request from a user of the system that includes a provisioning type and information file. The system utilizes the information file to correlate to additional subscriber data maintained in a database. With the information file, provisioning type, and additional subscriber data, the bulk provisioning system automatically creates one or more requests to the collaboration conferencing system to execute the bulk provisioning request. Further, the collaboration conferencing system may return a status and/or error in the bulk provisioning request to the bulk provisioning system.

12 Claims, 11 Drawing Sheets

(56) References Cited

U.S. PATENT DOCUMENTS

| | | | | |
|---|---|---|---|---|
| 2011/0058657 A1* | 3/2011 | Alegret | ............... | H04L 63/08 |
| | | | | 379/32.04 |
| 2011/0312305 A1* | 12/2011 | Jajodia | ............ | H04M 3/42017 |
| | | | | 455/414.1 |
| 2012/0179797 A1* | 7/2012 | Sharma | ............ | H04L 41/0806 |
| | | | | 709/223 |
| 2013/0219461 A1* | 8/2013 | Esaki | ................ | H04L 63/08 |
| | | | | 726/1 |
| 2015/0295788 A1* | 10/2015 | Witzman | ............. | H04L 41/18 |
| | | | | 709/224 |
| 2016/0188676 A1* | 6/2016 | Barker | ............... | H04L 47/762 |
| | | | | 707/770 |

* cited by examiner

BULK JOB PROVISIONING SYSTEM

TECHNICAL FIELD

Aspects of the present disclosure generally relate to systems and methods that provide for collaboration conferencing with multiple participants using devices connected to a telecommunication network, including a VoIP network, and more specifically for a system for executing bulk provisioning of subscriber information of the collaboration conferencing system.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from several users to several thousand users communicating on the same telephonic, video and/or data call.

In many instances, the collaboration conferencing system maintains information about the subscribers and/or customers allowed access to the collaboration conferencing system. Such information may include subscriber identifiers, subscriber access codes, and/or one or more collaboration conferencing features associated with the each subscriber's account. This information may be input to the collaboration conferencing system as customers or subscribers are added. Further, such information may be periodically updated as changes are made to an existing subscribers account. In general, subscriber information is provided to the system manually by one or more administrators of the collaboration conferencing system or underlying telecommunications network hosting the collaboration conferencing system. Such manual input of this information may be time consuming and error-prone. Further, subscribers to the collaboration conferencing system often must contact a representative of the system to input changes to the subscriber's account when many customers may prefer to manage their account themselves.

It is with these and other issues in mind that various aspects of the present disclosure were developed.

SUMMARY

One implementation of the present disclosure may take the form of a method for

Another implementation of the present disclosure may take the form of a system for

DETAILED DESCRIPTION

It is often the case that a telecommunications network provides access to collaboration conferencing features to customers of the network. However, the collaboration conference may be provided by a third party collaboration conferencing system that hosts and controls the collaboration conference for the customers of the network. As such, when new customers are added to the subscriber list of the collaboration conference (or one or more features of an existing customer's account is altered), an administrator of the telecommunications network provides the subscriber information to the third party collaboration conferencing system to provision the system with the new subscriber information. Often, providing such information to the collaboration conferencing system requires the manual input of the information to the collaboration conferencing system by a network administrator. For large provisioning jobs (such as the addition of several hundred new users), manual input may be time consuming and inefficient.

As such, aspects of the present disclosure involve systems, methods, computer program products, and the like, for receiving and executing a bulk provisioning job for a collaboration conferencing system. In particular, the system receives a bulk provisioning request from a user of the system that includes a provisioning type and information file. The provisioning type and file may include any number and type of subscriber information to the collaboration conference. The system utilizes the information file to correlate to additional subscriber data maintained in a database. With the information file, provisioning type, and additional subscriber data, the bulk provisioning system automatically creates one or more requests to the collaboration conferencing system to execute the bulk provisioning request. Further, the collaboration conferencing system may return a status and/or error in the bulk provisioning request to the bulk provisioning system. Such status and/or error may be reported to a user of the system through a user interface or other type of communication. In this manner, a user of the bulk provisioning system may automatically execute a bulk provisioning request to the collaboration conference of any number of subscriber's information to add users or alter an existing customer subscription.

Figure 1:
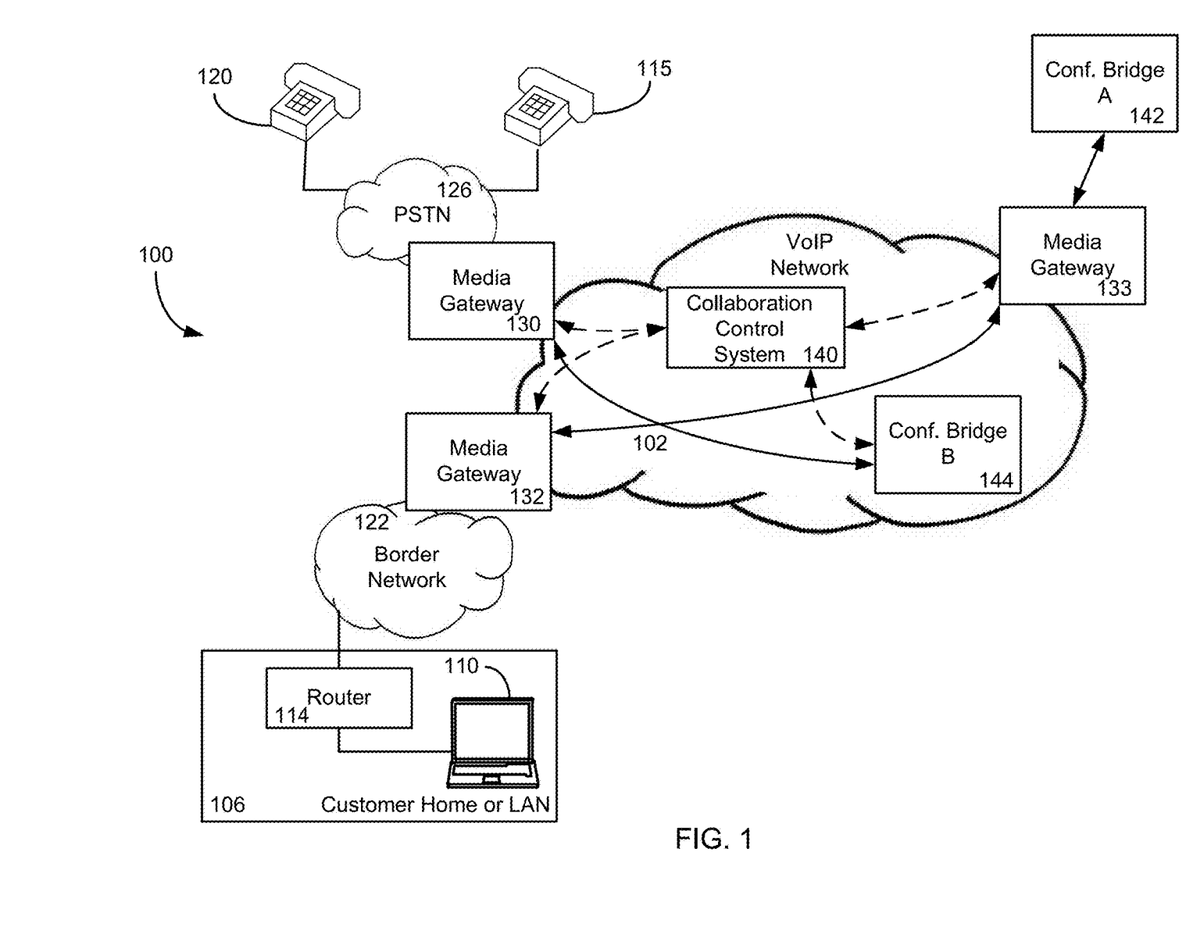
FIG. 1 is a schematic diagram illustrating an exemplary Voice over Internet Protocol (VoIP) operating environment, including a collaboration intelligence engine, in accordance with one embodiment.

FIG. 1 illustrates an exemplary operating environment 100 for hosting conference collaboration communications between multiple participants. The environment 100 provides for setting up communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that any communication network is envisioned as included in the operating environment 100. For example, network 102 may be a circuit switch communication network utilizing time division multiplexing (TDM) or plain old telephone service (POTS) switching. In general, the network 102 of FIG. 1 may be any communication network known or hereafter developed. However, for ease of understanding, a VoIP network embodiment is hereafter used to describe the communications network.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as telephonic devices 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be a wireless (e.g., cellular) telephone or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other types of devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference and/or web collaboration, although any type of collaboration conference over a telecommunications network is envisioned with respect to the present disclosure. Similarly, although FIG. 1 illustrates the communication devices 110, 115, 120 as telephonic devices, the communication devices may be any type of communication device, including personal computers, cellular phones and the like.

Upon receipt of the request for a collaboration conference, the network 102 routes the request to a collaboration control system 140 integrated within the network 102. It should be appreciated that the collaboration control system 140 may be a part of the network 102, may be separate from the network, or may have portions deployed in the network and out of the network. In addition, the collaboration control system 140 may be resident on one or more components of the VoIP network 102, including several instances of the collaboration control system integrated throughout the network.

To transmit the request to the network, the requester uses the communication device 110, 115, 120 to dial a conference specific telephone number and/or access a web-based collaboration conference component. In one embodiment, the network, upon receipt of the dialed communication, executes an application that queries the requester to enter an access code number that the requester enters into the communication device 110, 115, 120. In response, the collaboration control system 140 may route the one or more requests to one of several conference bridges 142, 144 associated with the VoIP network 102 for hosting of the collaboration conference. Although only two conference bridges 142, 144 are shown in FIG. 1, it should be appreciated that any number of conference bridges may be associated with the network 102 for hosting collaboration conferences.

In general, the conference bridges 142, 144 provide a hosting site for a collaboration conference between a plurality of users of the network 102. Thus, conference bridge A 142 may host a collaboration conference while conference bridge B 144 may host an additional collaboration conference. In particular, conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the communications network 102 through which the communications of the conference are transmitted. This configuration is utilized for Internet Protocol (IP) based bridges.

Additionally, the collaboration control system 140 may be configured for use with any number of network and conference bridge platforms. For example, the telecommunications network 102 of FIG. 1 may be configured as a TDM network or an IP-based network, which includes video, audio and web-based components, to which the routing component 140 may be configured to interface. Another particular network and/or conference bridge platform supported by the network configuration 102 of FIG. 1 is a Session Initiation Protocol (SIP) based network. For example, conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based routing devices may utilize many of the advantages of information exchange within the header when communicating with TDM-based network devices.

To connect to a collaboration conference, each participant to the conference may be routed to the same conference bridge 142, 144 for the duration of the conference. The conference bridge 142, 144, in turn, provides communication ports for each participant such that each participant can hear or otherwise participate in the collaboration conference. Any conference bridge known in the art or hereafter developed may be integrated into the system 100 of FIG. 1 for hosting a collaboration conference. In addition, the term "conference bridge" or "bridge" includes any component of a communication network that provides an access point to one or more users of the network for a collaboration conference. For example, "conference bridge" may also include such devices as a media server device, a gateway server device or the like as configured within the network 102.

In many instances, the conferencing bridge 142 that hosts a collaboration conference may be operated by an entity that is separate from the operator of the network 102. In such a configuration, an operator of the network 102 offers the collaboration conferencing feature to customers of the network and provides a connection between the customer and the conferencing bridge. However, the operation and maintenance of the conferencing bridge is performed by a third party entity. To provide the feature to the network customers, information of the customers of the network 102 that opt to receive a collaboration conferencing feature may be received at a network operations center and provided to the operator of the conferencing bridge to provision the conferencing bridge with the customers information. Often, this information is transmitted to the conferencing bridge operator manually by a network administrator, which can be time consuming and error-prone, especially for large transfers of customer information.

Figure 2:
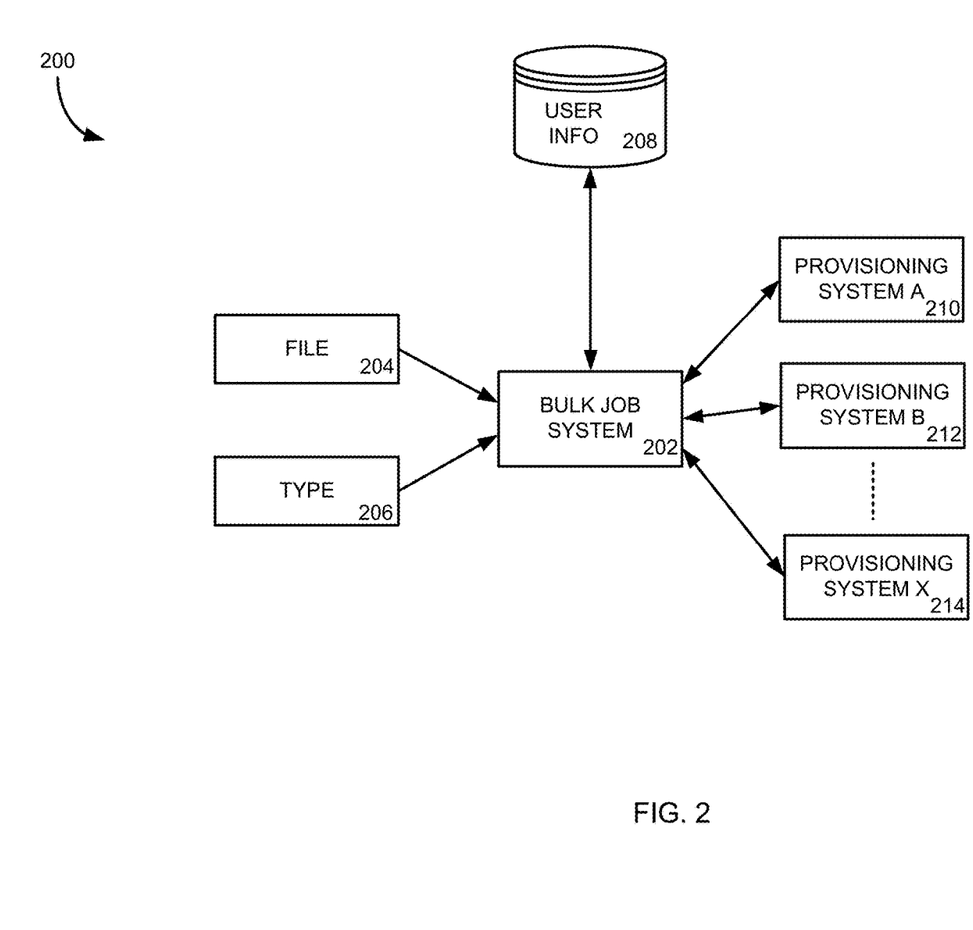
FIG. 2 is a schematic diagram illustrating an exemplary system for executing a request for bulk provisioning of subscriber information to a collaboration conferencing system.

To aid network administrators in provisioning customer information with a conferencing bridge operator, a system is illustrated in FIG. 2 for executing a request for bulk provisioning of subscriber information to a collaboration conferencing system. The system 200 may be utilized by network administrator to provision one or more subscribers to a collaboration conferencing system. In another embodiment, the system 200 may be utilized by a customer to the network 102 to alter one or more features of an existing subscription to the collaboration conferencing system.

The system includes a bulk job system 202 that provides an interface for a user to provide information to a collaboration conferencing system to provision subscribers to the collaboration conferencing system. In one embodiment, the bulk job system 202 is a computing device executing one or more instructions to perform the operations described herein. Further, the bulk job system 202 may include a user interface on a display associated with the computing device. The user interface provides for a user of the system 202 to input customer information or other information used by the system and to receive status and other information concerning the bulk job. The bulk job system 202 also communicates with one or more of the other components of the system 200 to provision subscribers to the collaboration conferencing system.

In general, the bulk job system 202 receives a file 204 of subscriber information and a type 206 of provisioning being requested of the collaboration conferencing system. In one embodiment, the file 204 and job type 206 is received through the user interface of the bulk job system 202. For example, a user of the bulk job system 202 may upload a data file 204 that includes the subscriber information and may select a job type 206 from a menu of available job types. In another embodiment, the file 204 and job type 206 is provided to the bulk job system 202 automatically from one or more other computing devices.

The bulk job system 202 may also be in communication with a database 208. The database 208 includes information of a subscriber to the collaboration conference or a customer of a telecommunications network 102. As explained in more detail below, the bulk job system 202 may correlate information received in the file 204 to information maintained in the database 208. Such correlated information may then be utilized by the bulk job system 202 to provision subscribers with one or more collaboration conferencing systems. Thus, the bulk job system 202 is also in communication with any number of collaboration conferencing provisioning systems 210-214. In particular, each collaboration conferencing system associated with the telecommunications network 102 may have a provisioning system 210-214. Such systems are illustrated in the system 200 of FIG. 2 as provisioning system A 210, provisioning system B 212, up through provisioning system X 214. In general, any number of provisioning systems 210-214 may be in communication with the bulk job system 202. By providing subscriber information to the associated provisioning system(s) 210-214, one or more subscribers may be given access to the collaboration conference system or provided with features associated with the collaboration conferencing system.

Figure 3:
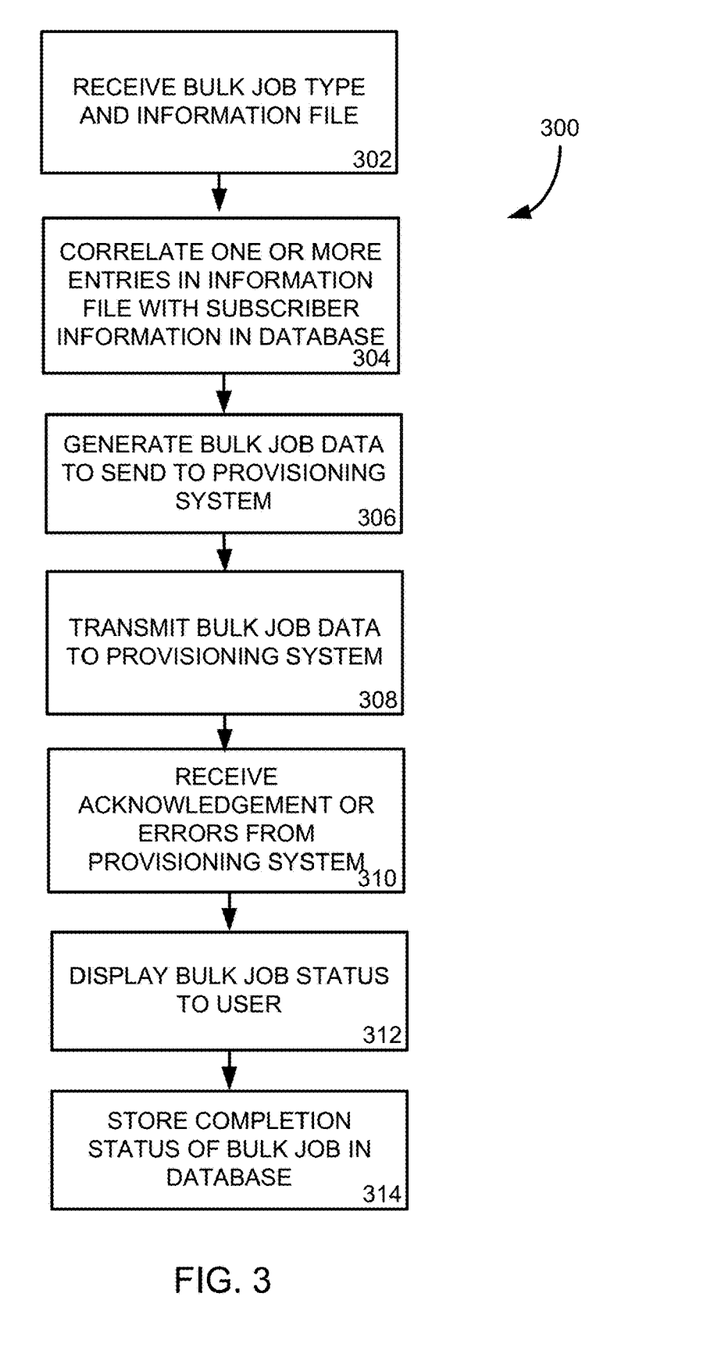
FIG. 3 is a flowchart of a method for a system to bulk provision subscriber information for a collaboration conferencing feature of a telecommunications network.

As mentioned, a user of the system 200 of FIG. 2 may provision one or more users or features of a collaboration conferencing system, particularly large or bulk provisioning of subscribers to the collaboration conferencing system. In particular, FIG. 3 is a flowchart of a method 300 for a system 200 to bulk provision subscriber information for a collaboration conferencing feature of a telecommunications network. The operations of the method 300 of FIG. 3 may be performed by the bulk job system 202 illustrated in FIG. 2. Thus, the bulk job system 202 may utilize a software program to perform the operations, one or more hardware components, or a combination of both software and hardware.

Beginning in operation 302, the bulk job system 202 receives an information file 204 and a provisioning job type 206 indication. As mentioned above, the file 204 and job type 206 may be provided to the bulk job system 202 may a user of the system through a user interface. The file 204 may include some type of customer or user information, such as an identification of one or more subscribers to a collaboration conferencing system and/or one or more features associated with the subscribers to the collaboration conferencing system. In one particular embodiment, the file 204 is a spreadsheet file that includes a listing of subscribers and other information to be provisioned in the collaboration conferencing system. Further, the bulk job system 202 may provide a template file that a user of the system may download and fill in with subscriber information that is used to provision the collaboration conferencing system. The template file may further instruct a user of the file on the type and number of subscriber information to include in the file 204 provide to the system 202. In this manner, a user may provide the bulk job system 202 with information that is used by the system to provision users of a collaboration conferencing system.

Similarly, the provisioning job type 206 may be provided to the bulk job system 202 to indicate the type of provisioning that is being requested by the user or the system. In particular, each collaboration conferencing system associated with a network 102 may be different types of provisioning jobs. For example, one type of provisioning job may be adding new subscribers to the collaboration conferencing system, while another type may be altering an existing account to include new features. The provisioning system 210-214 associated with a collaboration conferencing system may require different kinds of information to perform different provisioning jobs. For example, to add new subscribers to the system, the provisioning system 210-214 may request an identification of each new subscriber, a customer number to associate with each new subscriber, a list of features to associate with the new subscribers, and the like. In another example, to adjust the features or specifics of a current subscribers account, the provisioning system 210-214 may request some identification of the current subscriber and the new feature to be added. The information requested by the provisioning system 210-214 may be known by a network administrator or may be included in the file template available through the bulk job system 202 so that a user of the system may determine which information to include in the file 204. In this manner, the file template available through the bulk job system 202 may be altered or change based on the type of job 206 selected in the user interface. Further, the provisioning system 210-214 may determine which information included in the file 204 to use based on the provisioning job type 206 indicated by the bulk job system 202.

In one particular embodiment, the file 204 provided to the system 202 may be a generic file or otherwise may include any type of information concerning one or more users of the collaboration conferencing system. In such a circumstance, the bulk job system 202 may utilize the bulk job type 206 received through the user interface to analyze the received file 204 and obtain the useful information from the file. In other words, the bulk job system 202 may dynamically analyze the file 204 and obtain the information needed to perform the requested provisioning operations. For example, the bulk job system 202 may utilize an existing customer number to alter one or more features provided to subscribers associated with the customer number. Thus, after receiving an indication of the type of provisioning job requested, the bulk job system 202 may analyze the received file 204 to locate and obtain a customer number associated with the subscribers identified in the file. Other information associated with the subscribers identified in the file, such as access numbers, access codes, available features, and the like may be located within the file and obtained by the bulk job system 202 based on the provisioning job type 206 indicated in the bulk job system 202.

Continuing to operation 304, the bulk job system 202 may correlate one or more entries in the received file 204 with information stored in the database 208. For example, the file 204 may include a list of subscriber access numbers that are unique to the respective subscribers. The bulk job system 202, in turn, may utilize the access numbers to locate other information associated with the particular subscribers in the database and populate or otherwise include the obtained database information into the file 204. In this manner, information associated with one or more subscribers of the collaboration conferencing system may be included in the file 204 by the bulk job system 202 from the database 208 of subscriber information such that users of the system may not need to know or include all subscriber information within the file 204 provided to the system.

Further, through the database 208, information associated with the subscribers of the collaboration conferencing system may be updated by an administrator of the database or network. For example, subscribers to the collaboration conferencing system may have a randomly-generated access code associated with each subscriber. This access code may be generated or otherwise provided by the network 102 hosting the collaboration conferencing system. To update access codes, a network 102 administrator may store newly generated access codes within the database 208. When a new provisioning job is requested for those particular subscribers, the newly generated access codes may be associated with the subscribers in the file 204 as described above. During provisioning, the new access codes are thus provisioned for the subscribers without a user of the bulk job system 202 being tasked with providing the new access codes. In this manner, an administrator of the database 208 may update one or more items of the collaboration conferencing subscriber information directly within the database 208 such that the information is used during provisioning of the collaboration conferencing system.

In operation 306, the bulk job system 202 may generate a provisioning data file to provide to one or more provisioning systems 210-214 associated with one or more collaboration conferencing systems. The data file provided to the provisioning systems 210-214 may include information included in the file 204 provided to the system 202, the provisioning job type 206, and/or information obtained from the database 208. Once the data file is generated, the data file may be transmitted to the one or more provisioning systems 210-214 in operation 308. Upon receiving the data file, the one or more provisioning systems 210-214 may provision one or more collaboration conferencing systems based on the data file. In particular, the one or more provisioning systems 210-214 may execute the provisioning job type 206 indicated for the one or more collaboration conferencing systems utilizing the information in the data file. Further, the provisioning system 210-214 may provide one or more execution updates or status to the bulk job system 202 during the provisioning. Such updates may include errors in the provisioning execution for one or more subscribers, acknowledgments of a successful provisioning execution for one or more subscribers, and/or acknowledgement of the completion of the provisioning job.

In operation 312, the bulk job system 202 may provide the received provisioning job status to a user of the system. In one embodiment, the received status is displayed on a display device associated with the bulk job system computing device, such as within a user interface to the system. In another embodiment, the status may be included in an email transmitted to the user of the system. In general, the received status may be provided to the user in any manner to alert the user of the provisioning job status. Similarly, in operation 314, the bulk job system 202 may store the status of the requested provisioning job for future use by the user of the bulk job system. The stored status of the provisioning job may be stored along with previously executed provisioning jobs to provide a user of the bulk job system 202 a history of the provisioning jobs executed through the bulk job system. As explained in more detail below, the provisioning history may be utilized by a network administrator to determine how the one or more collaboration conferencing systems have been provisioned.

Figure 4:
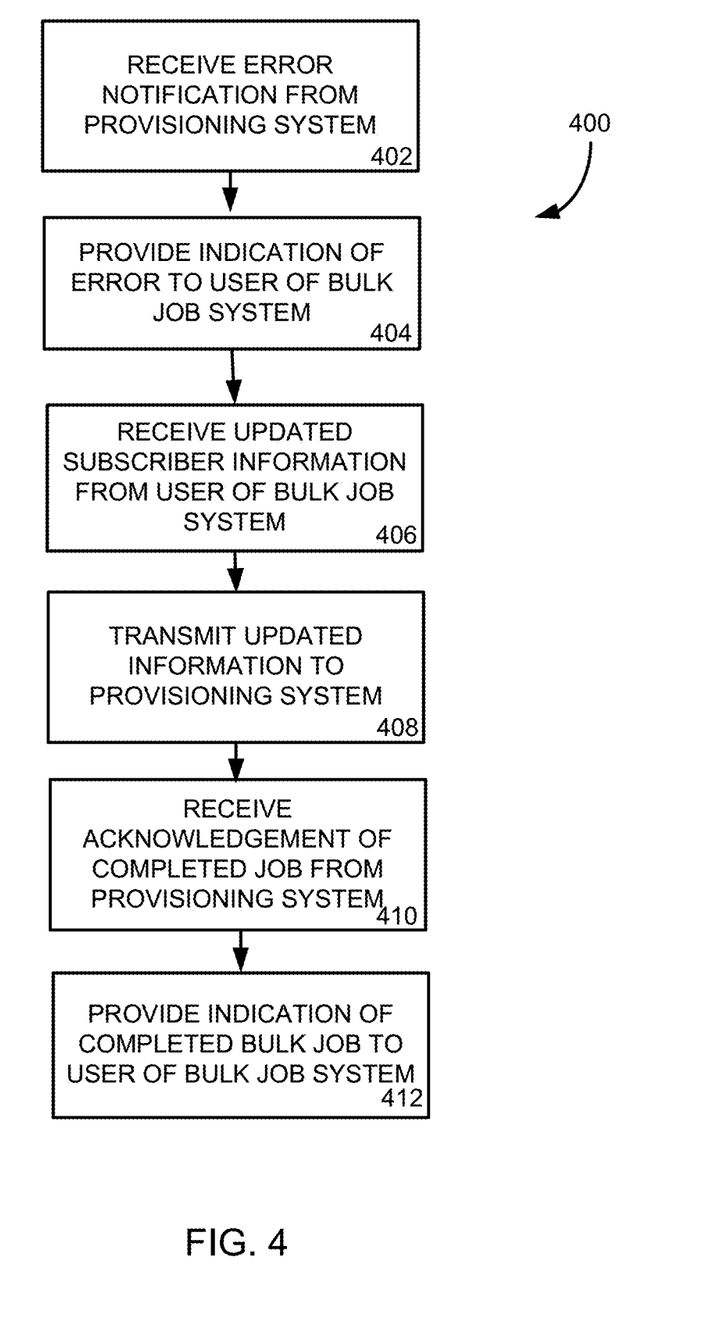
FIG. 4 is a flowchart of a method for a system to indicate a status of a bulk provision job of a collaboration conferencing system.

In some instances, the provisioning status transmitted to the bulk job system 202 indicates at least one error in the provisioning job due to improper information being provided to the provisioning system. For example, the data file provided to the provisioning system 201-214 may include a subscriber identifier that is not recognized by the provisioning system. In such circumstances, the bulk job system 202 may display the error to a user of the system and request corrected information from a user of the system. FIG. 4 is a flowchart of a method for a system to indicate a status of a bulk provision job of a collaboration conferencing system. Similar to the method of FIG. 3, the method 400 of FIG. 4 may be performed by the bulk job system 202 in response to an error received from one or more provisioning systems 210-214 of one or more collaboration conferencing systems.

Figure 8:
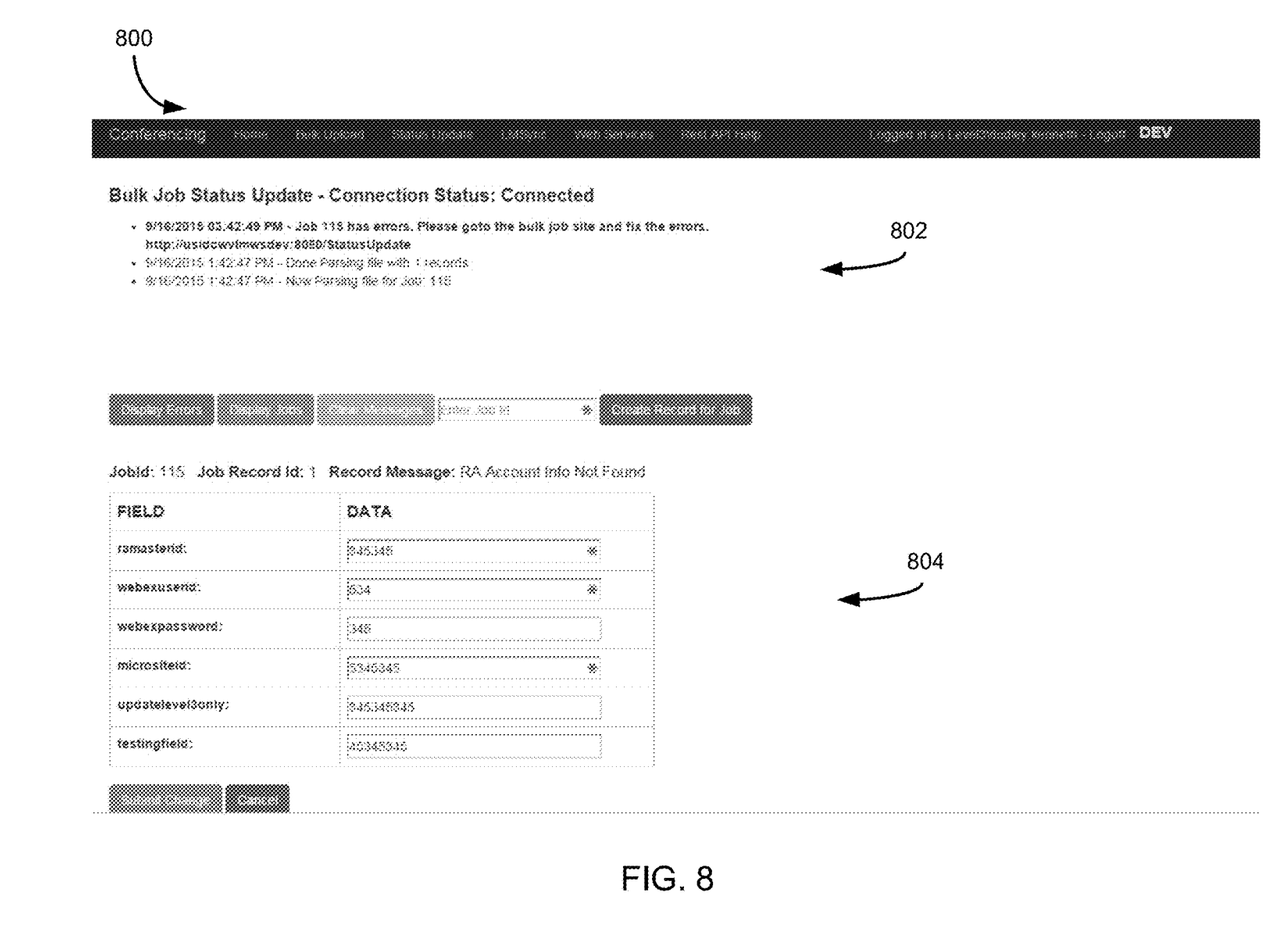
FIG. 8 is a screenshot of a bulk provisioning system user interface for providing updated subscriber information to the system.

Beginning in operation 402, the bulk job system 202 receives an indication of an error in a requested provisioning job. In one particular example, the error indication may be generated based on incorrect information provided to the provisioning system by the bulk job system 202. The type and details of the error is provided to a user of the bulk job system 202 in operation 404, such as by displaying the error to the user through a user interface associated with the bulk job system. Through the error indication, the bulk job system 202 may also provide inputs to correct the information in the data file transmitted to the provisioning system. For example, FIG. 8 is a screenshot 800 of a bulk provisioning system user interface for providing updated subscriber information to the system. As shown in the screenshot 800, an error message 802 is provided in the user interface in response to an error message received from a provisioning system 210-214. In addition to the error message 802, the user interface 800 may include a portion 804 for a user to input or correct the subscriber information provided to the provisioning systems 210-214. For example, a field may be included to provide a master identifier, an access number, an access code, etc. associated with a subscriber. In one embodiment, the fields may be populated with the subscriber information already received by the provisioning system 210-214, such as the information that caused the provisioning error. Through an input device to a computing device executing the user interface, a user may alter the subscriber information in the information portion 804 of the user interface in operation 406.

Once the new subscriber information is received through the user interface, the new information may be transmitted to one or more provisioning systems 210-214 in operation 408. With the updated subscriber information, the provisioning system 210-214 may attempt to complete the requested provisioning job as described above. In operation 410, the bulk job system 202 may receive an acknowledgement of a completed provisioning job and providing an indication of the successful completion of the provisioning job utilizing the updated information to a user in operation 412.

As mentioned above, the bulk job system 202 may include a user interface through which a user of the system may interact and request one or more bulk provisioning jobs for one or more collaboration conferencing systems associated with a telecommunications network. FIGS. 5-10 are screenshots of one embodiment of the user interface to the bulk provisioning system 202. Other methods for interacting with the bulk job system 202 are also contemplated with other user interface designs.

Figure 5:
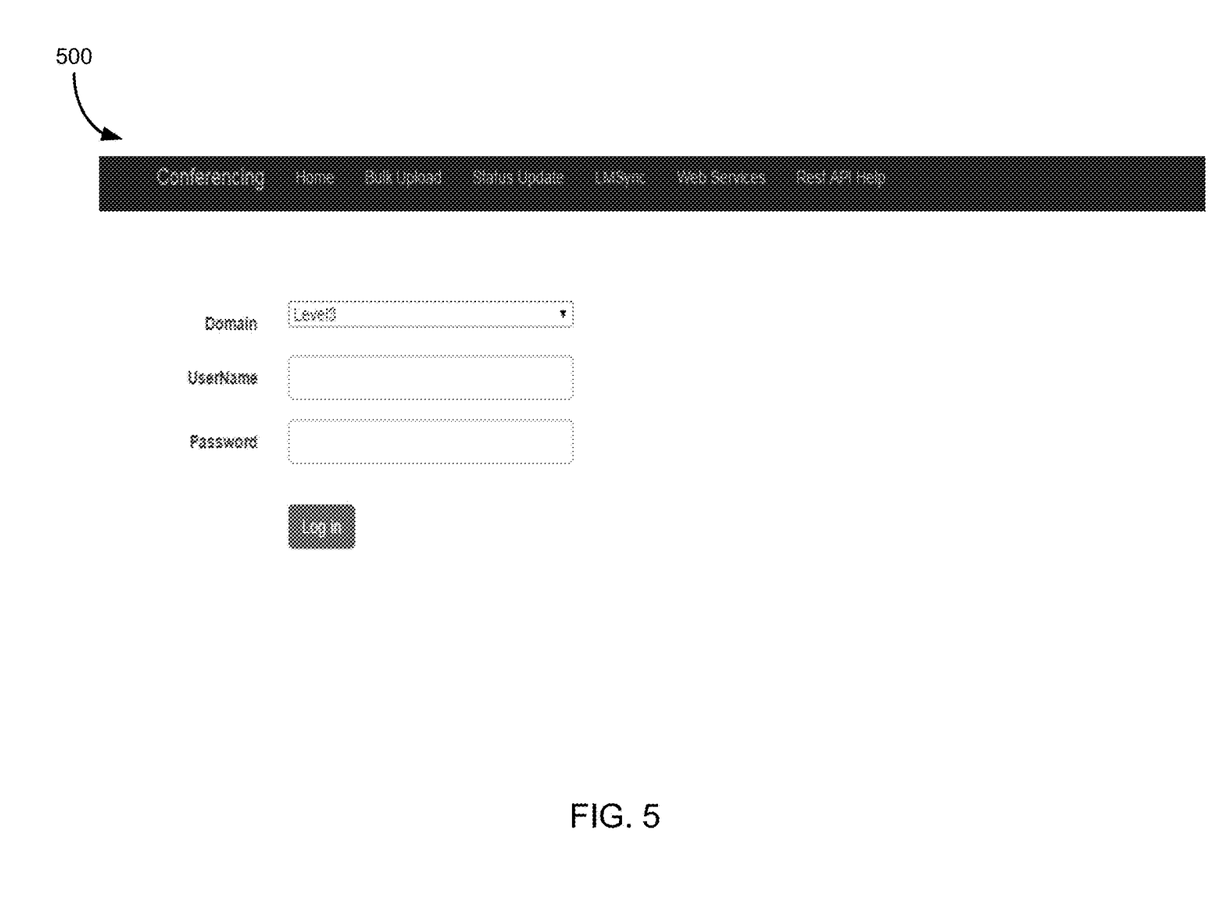
FIG. 5 is a screenshot of a user interface to access a system to receive a bulk provisioning request from a user.

FIG. 5 is a screenshot 500 of a user interface to access a system to receive a bulk provisioning request from a user. As shown, the user interface may include a screen 500 to log into the bulk job system 200. The login screen 500 may include a field for entering a username 502 and a field for entering a password 504. Through the login screen 500, access to the bulk job system 202 may be restricted to particular users given access by an administrator of the bulk job system.

Figure 6:
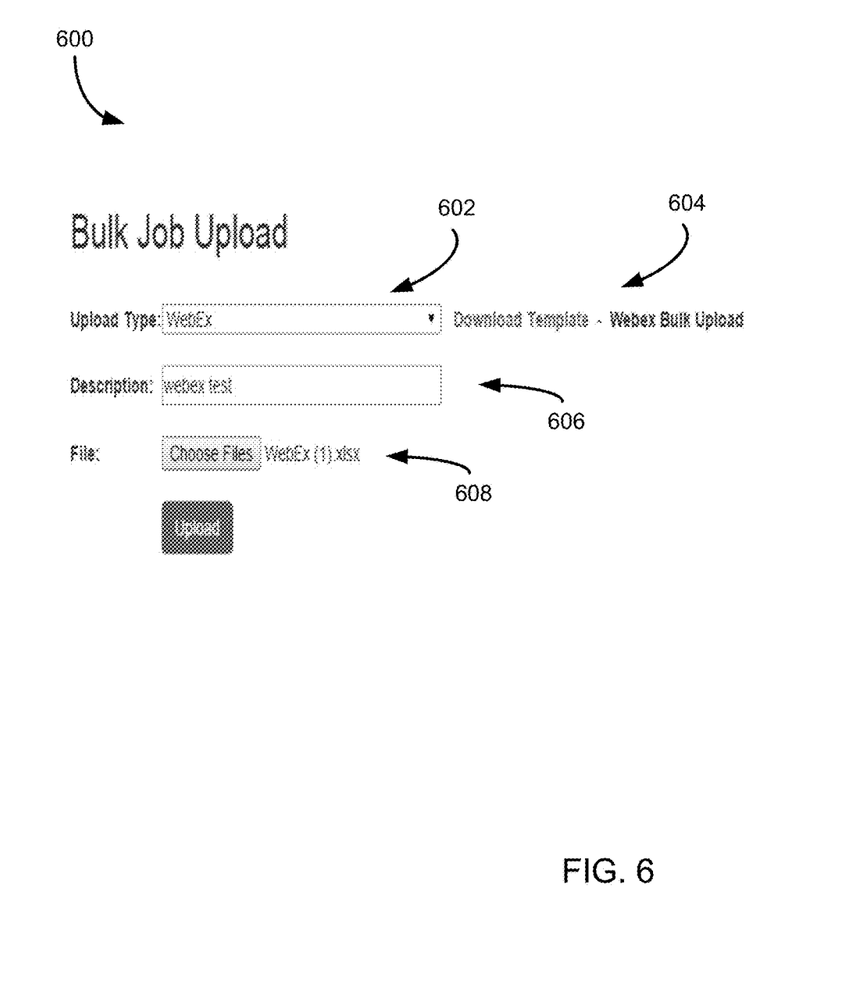
FIG. 6 is a screenshot of a user interface to upload a bulk provisioning request to a bulk provisioning system.

FIG. 6 is a screenshot 600 of a user interface to upload a bulk provisioning request to a bulk provisioning system. As shown, the user interface includes a screen 600 to upload a file of subscriber information and/or indicate a provisioning job type. In particular, the user interface 600 includes a field 602, such as a drop down menu, through which a user may select a provisioning job type from a selection of provisioning job types. Further, the interface 600 may include a link 604 to a template file as described above that is associated with the selected provisioning job type. Thus, as the provisioning job type 602 is changed, the link to the template file 604 may also change accordingly. In one particular embodiment, the user interface 600 may include a title field 606 for naming a particular provisioning job and a button 608 or other input for uploading a file 204 for use during the requested provisioning job with the collaboration conferencing system.

Figure 7:
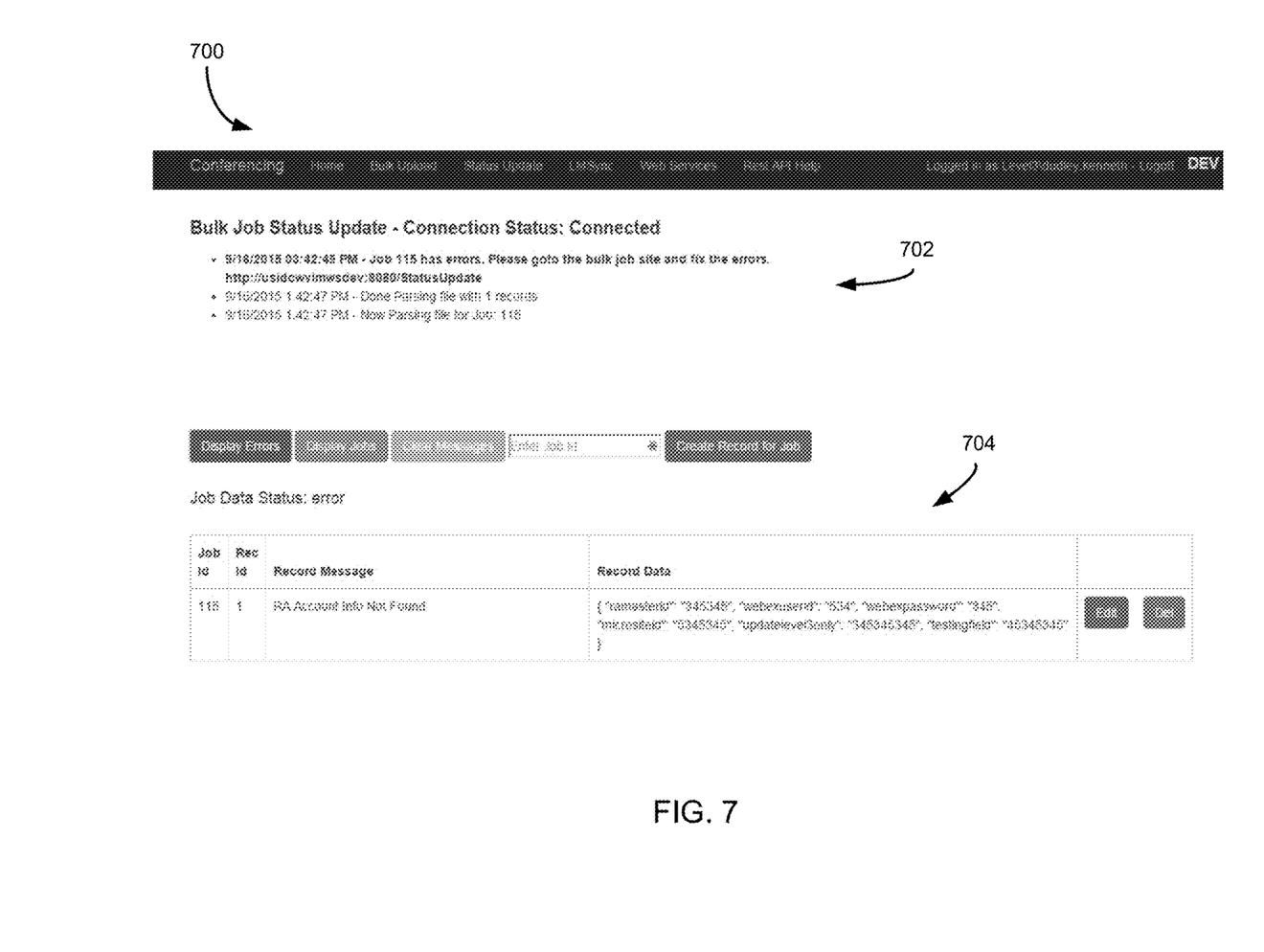
FIG. 7 is a screenshot of a bulk provisioning system user interface indicating a bulk job status to a user of the interface.

FIG. 7 is a screenshot 700 of a bulk provisioning system user interface indicating a bulk job status to a user of the interface. As shown, the user interface 700 includes a portion 702 reporting an error in a requested provisioning job. The reported error 702 may include information concerning the received error from the provisioning system. In one particular example, the user interface 700 may include a portion 704 that illustrates the subscriber information provided to the provisioning system that instigated the provisioning error. Similarly, in FIG. 8, the user interface 800 includes a portion showing the error 802 information and a portion 804 through which the user may update the subscriber information, as described above.

Figure 9:
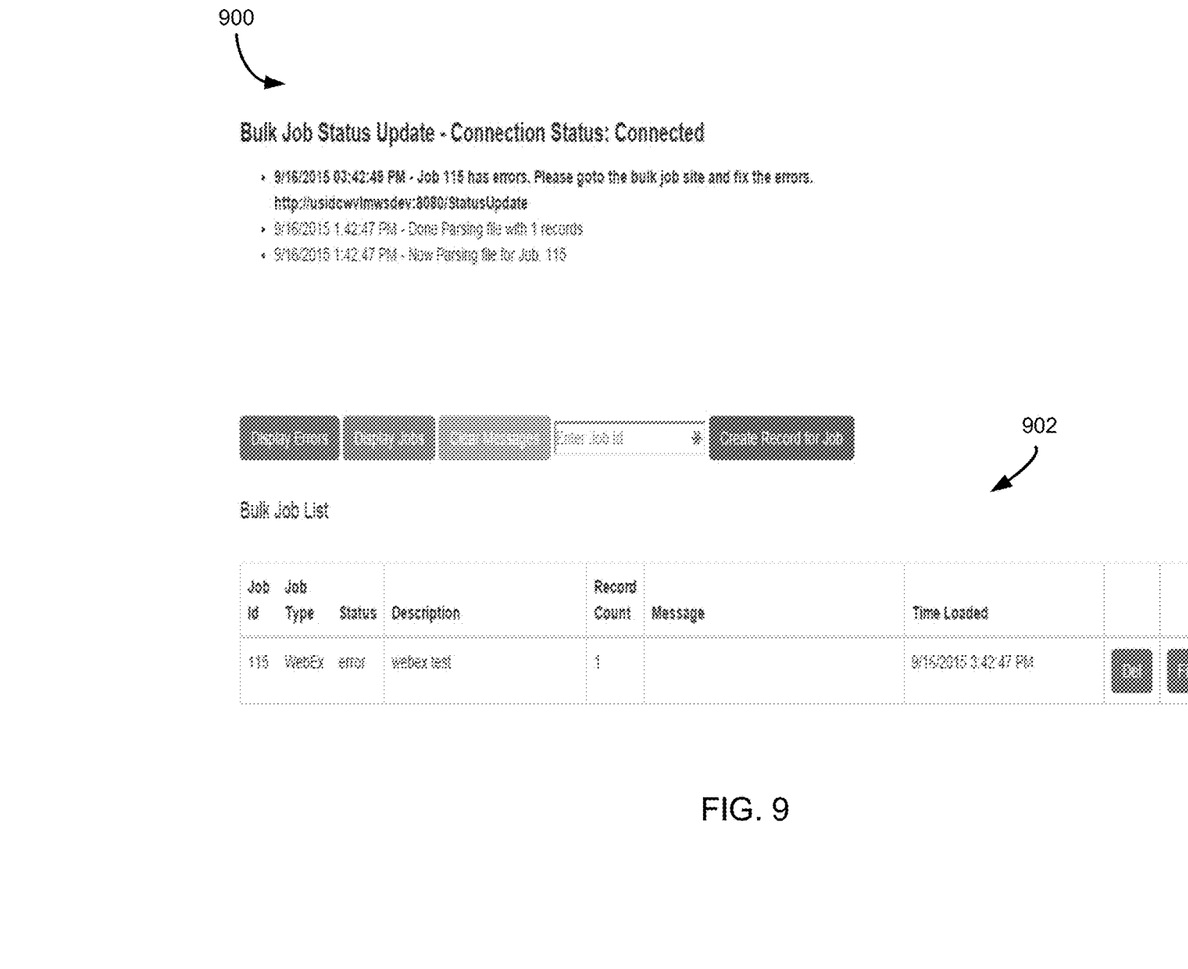
FIG. 9 is a screenshot of a bulk provisioning system user interface displaying a record of completed bulk provisioning jobs.
Figure 10:
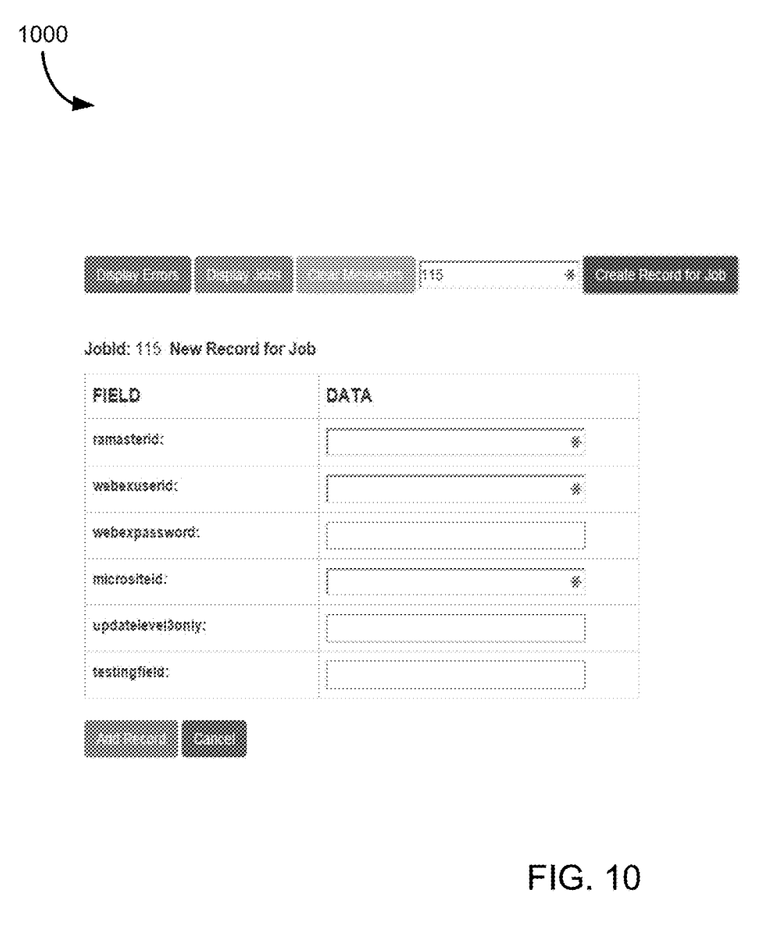
FIG. 10 is a screenshot of a bulk provisioning system user interface for receiving a record for a bulk provisioning job for a collaboration conferencing system.

FIG. 9 is a screenshot 900 of a bulk provisioning system user interface displaying a record of completed bulk provisioning jobs. In general, the user interface 900 may include a listing 902 of requested bulk provisioning jobs. In one embodiment, the listing 902 may include a job identifier, a job title, a job status, a text description of the requested job, and/or other information concerning the provisioning job. Any number of requested jobs may be illustrated in the job history listing 902 such that a user of the bulk job system 202 may obtain a history of all or some requested provisioning jobs entered through the bulk job system. Further, the user interface may allow a user to create a new job within the user interface. In particular, FIG. 10 is a screenshot 1000 of a bulk provisioning system user interface for receiving a record for a bulk provisioning job for a collaboration conferencing system. Through the various fields 1002 in the user interface 1000, a user of the bulk job system 202 may enter a record for a provisioning job requested through the bulk job system.

Figure 11:
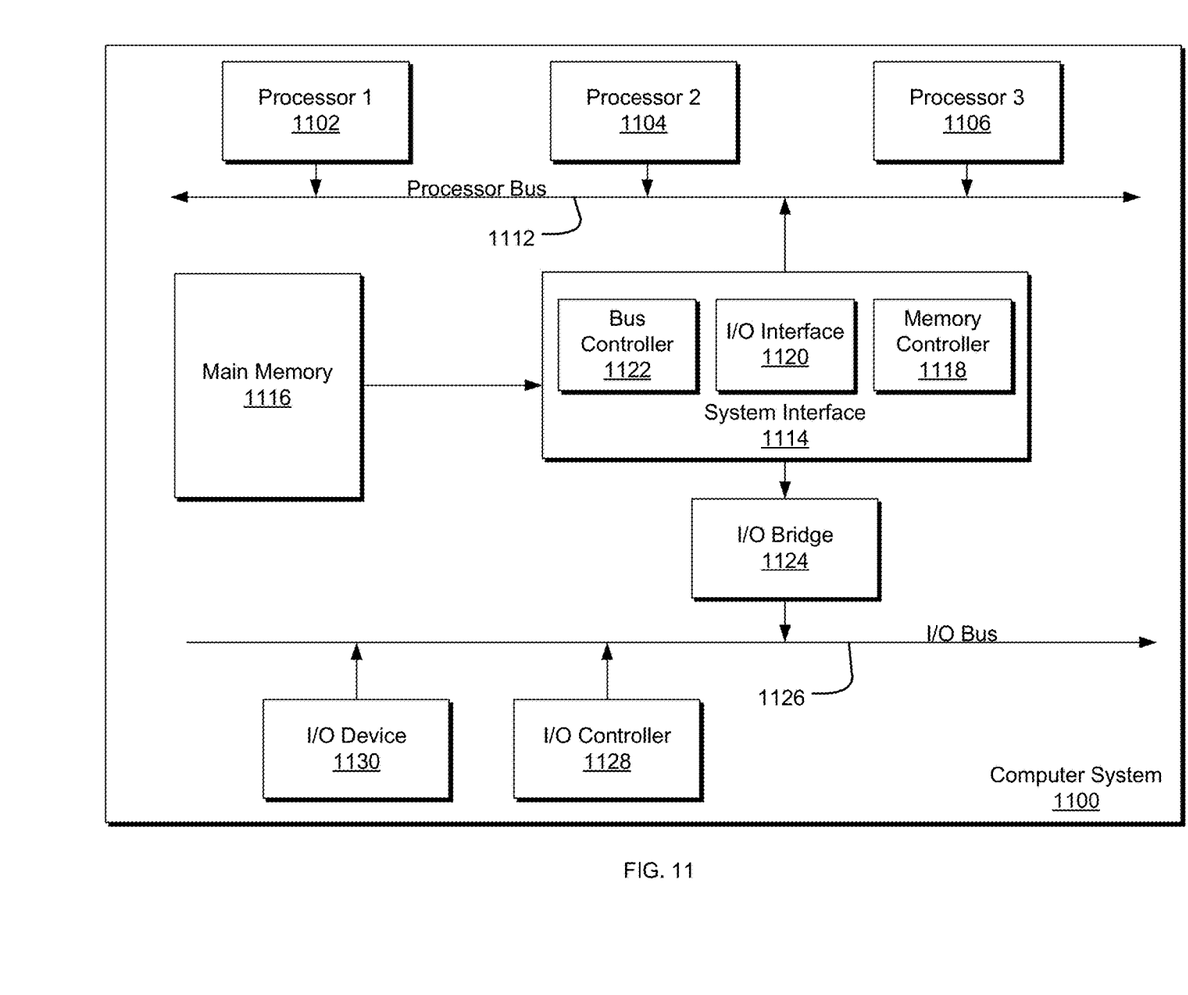
FIG. 11 is a diagram illustrating an example of a computing system which may be used in implementing embodiments of the present disclosure.

FIG. 11 is a block diagram illustrating an example of a computing device or computer system 1100 which may be used in implementing embodiments of the present invention. For example, the computing system 1100 may be the bulk job system 202 described above. The computer system (system) includes one or more processors 1102-1106. Processors 1102-1106 may include one or more internal levels of cache (not shown) and a bus controller or bus interface unit to direct interaction with the processor bus 1112. Processor bus 1112, also known as the host bus or the front side bus, may be used to couple the processors 1102-1106 with the system interface 1114. Processors 1102-1106 may also be purpose built for processing/mixing media data, such as audio or video components of a media stream, such as a digital signal processor. System interface 1114 may be connected to the processor bus 1112 to interface other components of the system 1100 with the processor bus 1112. For example, system interface 1114 may include a memory controller 1116 for interfacing a main memory 1116 with the processor bus 1112. The main memory 1116 typically includes one or more memory cards and a control circuit (not shown). System interface 1114 may also include an input/output (I/O) interface 1120 to interface one or more I/O bridges or I/O devices with the processor bus 1112. One or more I/O controllers and/or I/O devices may be connected with the I/O bus 1126, such as I/O controller 1128 and I/O device 1160, as illustrated.

I/O device 1160 may also include an input device (not shown), such as an alphanumeric input device, including alphanumeric and other keys for communicating information and/or command selections to the processors 1102-1106. Another type of user input device includes cursor control, such as a mouse, a trackball, or cursor direction keys for communicating direction information and command selections to the processors 1102-1106 and for controlling cursor movement on the display device.

System 1100 may include a dynamic storage device, referred to as main memory 1116, or a random access memory (RAM) or other computer-readable devices coupled to the processor bus 1112 for storing information and instructions to be executed by the processors 1102-1106. Main memory 1116 also may be used for storing temporary variables or other intermediate information during execution of instructions by the processors 1102-1106. System 1100 may include a read only memory (ROM) and/or other static storage device coupled to the processor bus 1112 for storing static information and instructions for the processors 1102-1106. The system set forth in FIG. 11 is but one possible example of a computer system that may employ or be configured in accordance with aspects of the present disclosure.

According to one embodiment, the above techniques may be performed by computer system 1100 in response to processor 1104 executing one or more sequences of one or more instructions contained in main memory 1116. These instructions may be read into main memory 1116 from another machine-readable medium, such as a storage device. Execution of the sequences of instructions contained in main memory 1116 may cause processors 1102-1106 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1116. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for provisioning a network, the method comprising:
   receiving a file comprising subscriber information for multiple subscribers for a collaboration conferencing system and an indication of a provisioning job type;
   correlating additional subscriber information for the multiple subscribers from a database with the subscriber information of the received file based on the provisioning job type;
   generating a bulk job data file for the multiple subscribers, wherein the bulk job data file comprises the subscriber information of the received file and the correlated additional subscriber information;
   transmitting the bulk job data file to a collaboration conferencing provisioning system to cause the collaboration conferencing provisioning system to provision network resources for the multiple subscribers;
   receiving an acknowledgment of a completed provisioning of the collaboration conferencing system from the collaboration conferencing provisioning system;
   displaying a user interface on a display of a computing system and wherein the file is received through the user interface at the computing system;
   displaying a status of the provisioning of the collaboration conferencing system form the collaboration conferencing provisioning system;

receiving an error message from the collaboration conferencing provisioning system indicating an error in the provisioning of the collaboration conferencing system; and receiving updated subscriber information through the user interface in response to the error message and transmitting the updated subscriber information to the collaboration conferencing provisioning system.

2. The method of claim 1 wherein the displayed status comprises the acknowledgment of the completed provisioning of the collaboration conferencing system.

3. The method of claim 1 wherein the displayed status comprises the error message from the collaboration conferencing provisioning system and at least one entry of subscriber information associated with the error message.

4. The method of claim 1 further comprising:
displaying a history of provisioning jobs from the collaboration conferencing provisioning system.

5. The method of claim 1 wherein the received file comprises at least one identifier of a subscriber to the collaboration conferencing system and the correlated additional subscriber information comprises a customer identifier and a subscriber password.

6. The method of claim 1 wherein the indication of a provisioning job type comprises at least an identification of the collaboration conferencing system.

7. A system for provisioning a collaboration conference system on a telecommunications network, the system comprising:
a database storing subscriber information for at least for multiple subscribers of a collaboration conference feature hosted by the telecommunications network; and
a bulk provisioning job system comprising:
a processing device; and
a computer-readable medium connected to the processing device configured to store information and instructions that, when executed by the processing device, performs the operations of:
receiving a file comprising subscriber information for the multiple subscribers for a collaboration conferencing system and an indication of a provisioning job type;
correlating additional subscriber information for the multiple subscribers from the database with the subscriber information of the received file based on the provisioning job type;
generating a bulk job data file for the multiple subscribers, wherein the bulk job data file comprises the subscriber information of the received file and the correlated additional subscriber information;
transmitting the bulk job data file to a collaboration conferencing provisioning system to cause the collaboration conferencing provisioning system to provision network resources for the multiple subscribers;
receiving an acknowledgment of a completed provisioning of the collaboration conferencing system from the collaboration conferencing provisioning system;
causing a display device to display a user interface in communication with the bulk job provisioning system and wherein the file is received through the user interface at the display device;
causing the display device to display a status of the provisioning of the collaboration conferencing system form the collaboration conferencing provisioning system;
receive an error message from the collaboration conferencing provisioning system indicating an error in the provisioning of the collaboration conferencing system; and
receive updated subscriber information through the user interface in response to the error message and transmitting the updated subscriber information to the collaboration conferencing provisioning system.

8. The system of claim 7 wherein the displayed status comprises the acknowledgment of the completed provisioning of the collaboration conferencing system.

9. The system of claim 7 wherein the displayed status comprises the error message from the collaboration conferencing provisioning system and at least one entry of subscriber information associated with the error message.

10. The system of claim 7 wherein the instructions further cause the bulk provisioning job system to:
display a history of provisioning jobs from the collaboration conferencing provisioning system on the display device.

11. The system of claim 7 wherein the received file comprises at least one identifier of a subscriber to the collaboration conferencing system and the correlated additional subscriber information comprises a customer identifier and a subscriber password.

12. The system of claim 7 wherein the indication of a provisioning job type comprises at least an identification of the collaboration conferencing system.

* * * * *